March 26, 1940.  J. M. F. OYEN ET AL  2,194,807
COFFEE MAKING MACHINE
Filed April 4, 1938  10 Sheets-Sheet 3

INVENTORS:
John M. F. Oyen
John A. Svendsgaard
BY THEIR ATTORNEY
Chas. E. Townsend.

March 26, 1940.  J. M. F. OYEN ET AL  2,194,807
COFFEE MAKING MACHINE
Filed April 4, 1938   10 Sheets-Sheet 9

INVENTORS John M. F. Oyen
Jno. A. Svendgaard
BY THEIR
ATTORNEY Chas. E. Townsend.

Patented Mar. 26, 1940

2,194,807

UNITED STATES PATENT OFFICE 2,194,807

COFFEE MAKING MACHINE

John M. F. Oyen and John A. Svendsgaard, Oakland, Calif.

Application April 4, 1938, Serial No. 199,835

7 Claims. (Cl. 53—3)

The present invention relates to coffee making machines, and more particularly to a machine which will operate automatically to maintain a constant supply of hot water, to measure quantities of hot water and coffee at timed intervals, and to cause the hot water to percolate through the coffee until a predetermined level of coffee is reached in a coffee storage tank.

One object of the present invention is to provide a machine of the type described comprising means for supporting measured quantities of coffee in superposed spaced relation while hot water percolates through said quantities of coffee and intermittently to add fresh coffee and to advance said quantities of coffee downwardly so that the lowermost of said quantities through which the water has percolated the most may be discharged.

A further object is to provide supporting screens for said quantities of coffee and to provide for the automatic reversal of position of said screens so that they will be self-cleaning during the coffee making operation.

A further object is to maintain a supply of dry coffee in a container where it is subjected to agitation and free from moisture.

A still further object is to provide in such a machine means for varying the amount of dry coffee which is automatically delivered to the mixing chamber where the water percolates through the coffee.

Further objects and advantages of the invention will be made apparent in the following specification wherein reference is made to the accompanying drawings in which a preferred form of the invention is illustrated.

Referring in detail to the accompanying drawings wherein like parts are designated by like reference numerals in the several views, the invention is illustrated as comprising a water boiler 1 (see Figs. 1 and 2), from one corner of which a riser 2 extends vertically to support and communicate with a header 3. A coffee hopper 4 for containing fresh ground coffee is supported directly over a coffee measuring and dispensing compartment which consists principally of the separable halves 5 and 6 bound together as shown. An elongated vertically extending coffee percolating chamber is disposed below the dispensing compartment 5 and 6, and consists principally of the casing formed of the parts 7 and 8.

Figures 3, 3A:
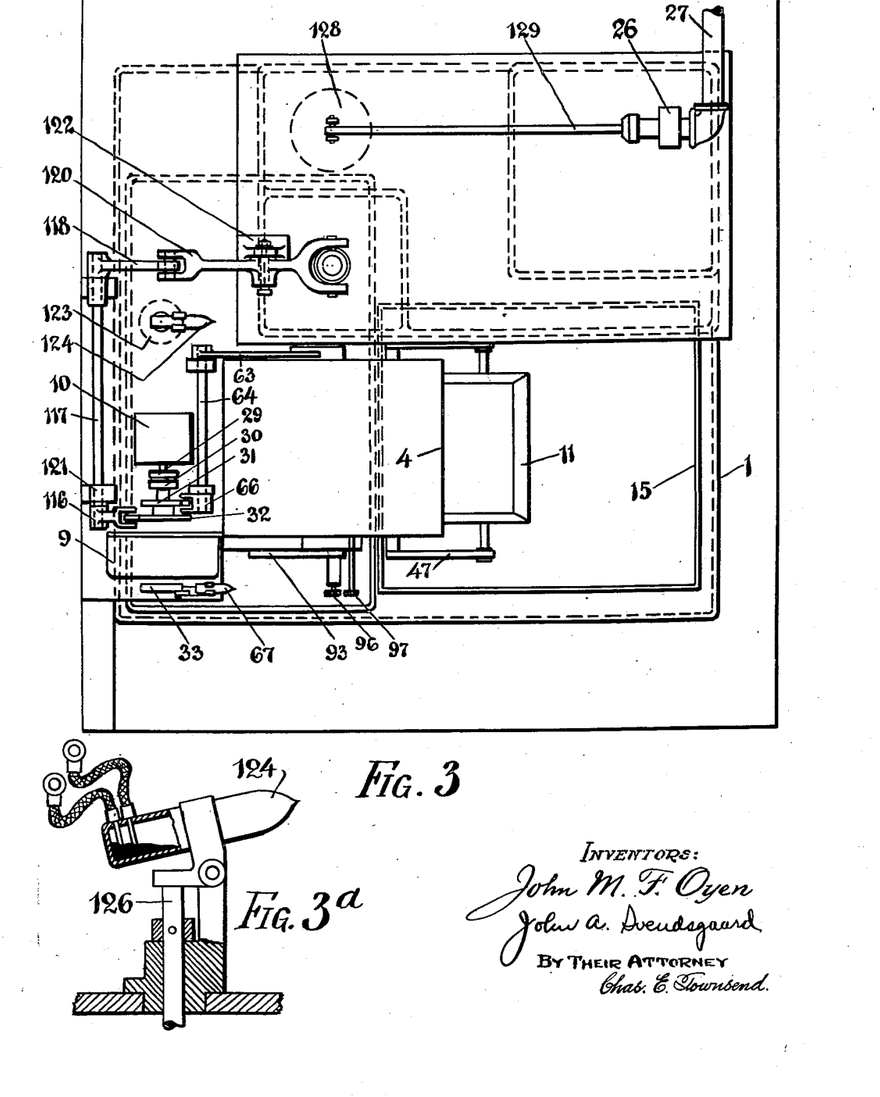
Fig. 3 is a plan view of the machine illustrated in Fig. 1.
Fig. 3a is a detail view partially in section of a control switch illustrated in Fig. 3.

A gear transmission contained in a housing 9 transmits power from a motor indicated at 10 (see Fig. 3) to operate the coffee percolating mechanism, as will hereinafter be described in detail, and a dumping carriage 11 for discharging used coffee grounds is normally disposed beneath the coffee percolating chamber and operates between track frames 12 and 13. A coffee reservoir 14 to receive the liquid coffee that has been percolated is disposed on top of the boiler 1 and has a portion of its bottom depending into said boiler so that the coffee therein will be retained at a high temperature suitable for serving. A receptacle 15 is provided for discharged coffee grounds.

Hot water is delivered to the upper end of the coffee percolating chamber through a pair of perforated spouts 18 (see Figs. 2 and 4) which communicate with a water measuring chamber 17 disposed within the header 3. A valve 19 operates intermittently through mechanism hereinafter to be described to permit the water in the measuring chamber 17 to flow through the spouts 18. A stem 20 which supports and operates the valve 19 extends upwardly through a tube 21 with sufficient clearance to permit air to pass through said tube so that when water is drained from the measuring compartment 17 by opening the valve, water from the interior of the header 3 may enter freely through small ports 21a in the top of the measuring chamber and refill the same preparatory to the next opening of the valve 19. The tube 21 serves as a vent, having two functions, one being to permit air to enter the chamber 17 while water is flowing out through the valve 19, and the other being to permit air to escape from chamber 17 while water enters through the ports 21a.

Figure 4:
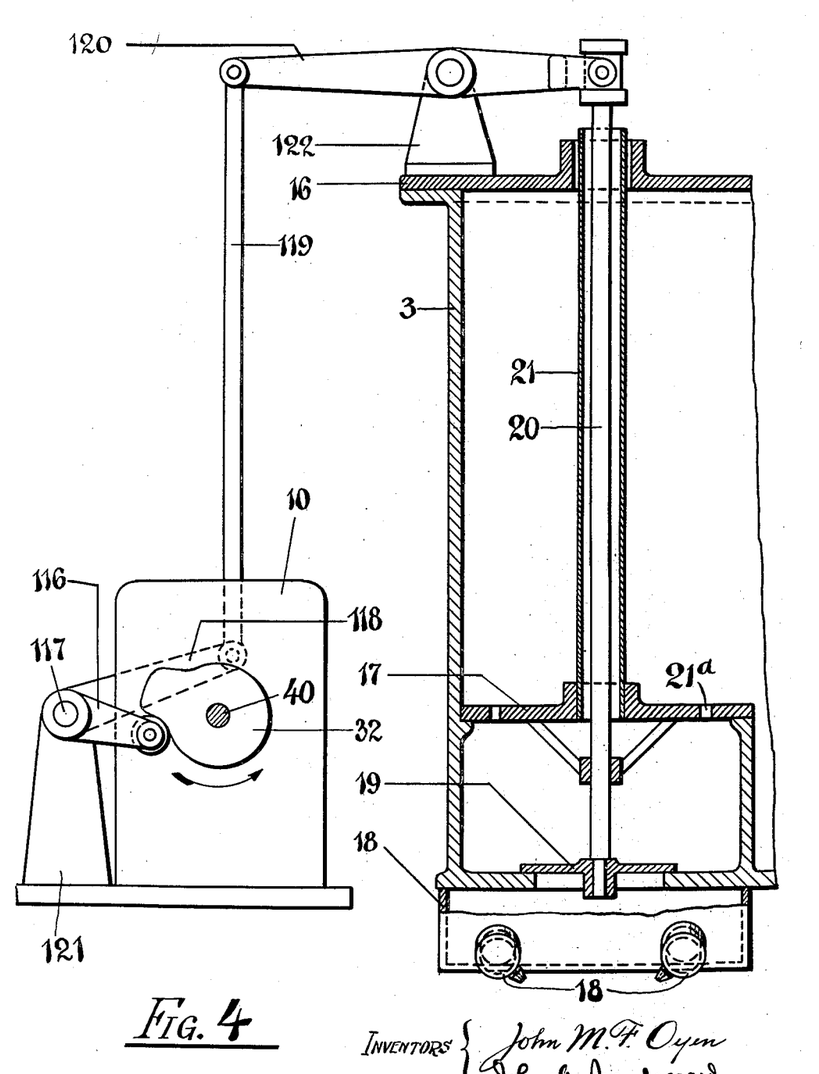
Fig. 4 is an enlarged fragmentary view illustrating details of a water-measuring compartment and means for operating the same.

The mechanism for opening the valve 19 intermittently and in timed relation to the operation of the machine is illustrated in Fig. 4 of the drawings. The cam 32 (see also Fig. 13) engages a friction roller on the end of an arm 116 fixed to a shaft 117 journaled in a supporting bracket 121. Upon rotation of the cam 32, the raised portion of its periphery rocks the arm 116 and shaft 117 and imparts rocking movement to an arm 118 secured to the opposite end of the shaft 117. The arm 118 is connected by a link 119 to one end of a lever 120 pivoted on a fulcrum 122. The opposite end of the lever 120 is connected with the upper end of the stem 20 of the valve 19. Therefore, as the cam 32 is driven by the main shaft 40, the valve 19 is opened in timed relation to the operation of the machine to cause the water in the chamber 17 to flow through the coffee percolator chamber at properly timed intervals.

A gas burner 22 is positioned below the boiler 1 and a thermostat 23 within the boiler operates a conventional thermostat valve 23a (see Figs. 1 and 2) to control the flow of gas to said burner through a supply pipe 28 and thus maintain a constant desired temperature of the water within the boiler. A coffee faucet 24, illustrated in Fig. 1, communicates with the coffee reservoir 14 for withdrawing coffee as desired, and a similar faucet 25 communicates with the interior of the boiler 1 so that hot water may be drawn off as needed. The water in the boiler is kept at a constant level by means of a ball cock 26 connected with a source of fresh water by a pipe 27, and controlled by a float ball 128 disposed within the header 3 and supported on a rod 129 which forms an operating lever for the cock 26. As inlet pipe 26a preferably extends downwardly from the cock so that the cold water is admitted near the lower part of the boiler.

Figures 13, 14:
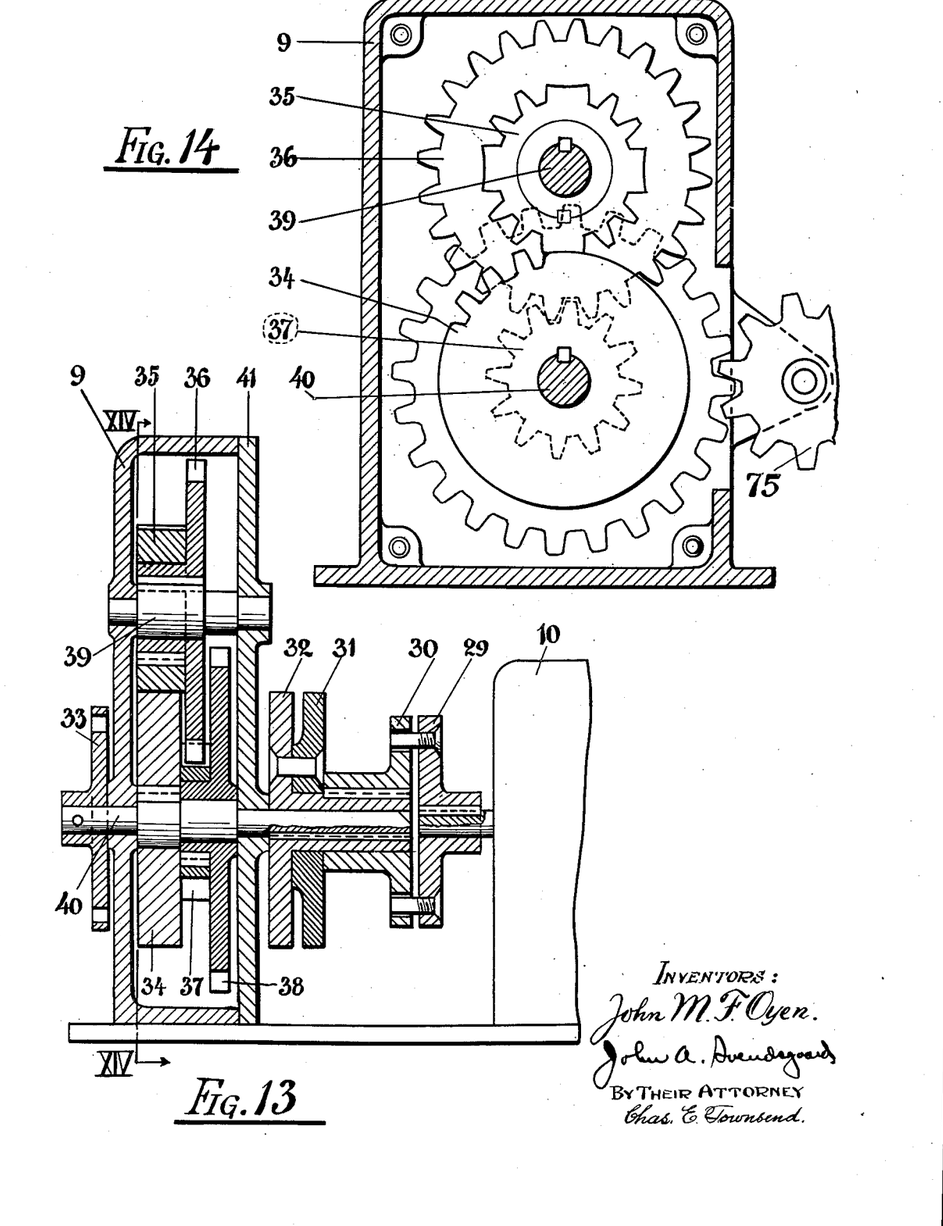
Fig. 13 is a central vertical section taken through the gear transmission which times the operation of the coffee percolating mechanism.
Fig. 14 is a section taken on line XIV—XIV of Fig. 13.

As illustrated in Fig. 13, the motor 10 is connected with the transmission 9 through a flexible coupling comprising the loosely connected coupling members 29 and 30 to rotate shaft 40 to which is secured cams 31, 32 and 33 exteriorly of the transmission housing 9. Within the housing 9 an intermittent gear 34 is fixed to the shaft 40 and is positioned to mesh intermittently with gear 35 (see also Fig. 14) supported on a counter shaft 39. For each revolution of the intermittent gear 34, the gear 35 is rotated one-quarter turn, and a gear 36 which is keyed to the gear 35 is simultaneously rotated and imparts rotary movement to a gear 37 keyed to gear 38, the latter two gears being freely rotatable on the shaft 40. The gear 38 is connected through a gear train including gears 75, 74, 45 and 76 (see Fig. 1) with the intermeshing gears 42, 43 and 44 on the coffee percolator housing, the gear ratio of this chain being such that for each intermittent movement of the gear 38 the gears 42, 43 and 44 will be rotated through 180° for a purpose presently to be set forth in detail.

Figure 1:
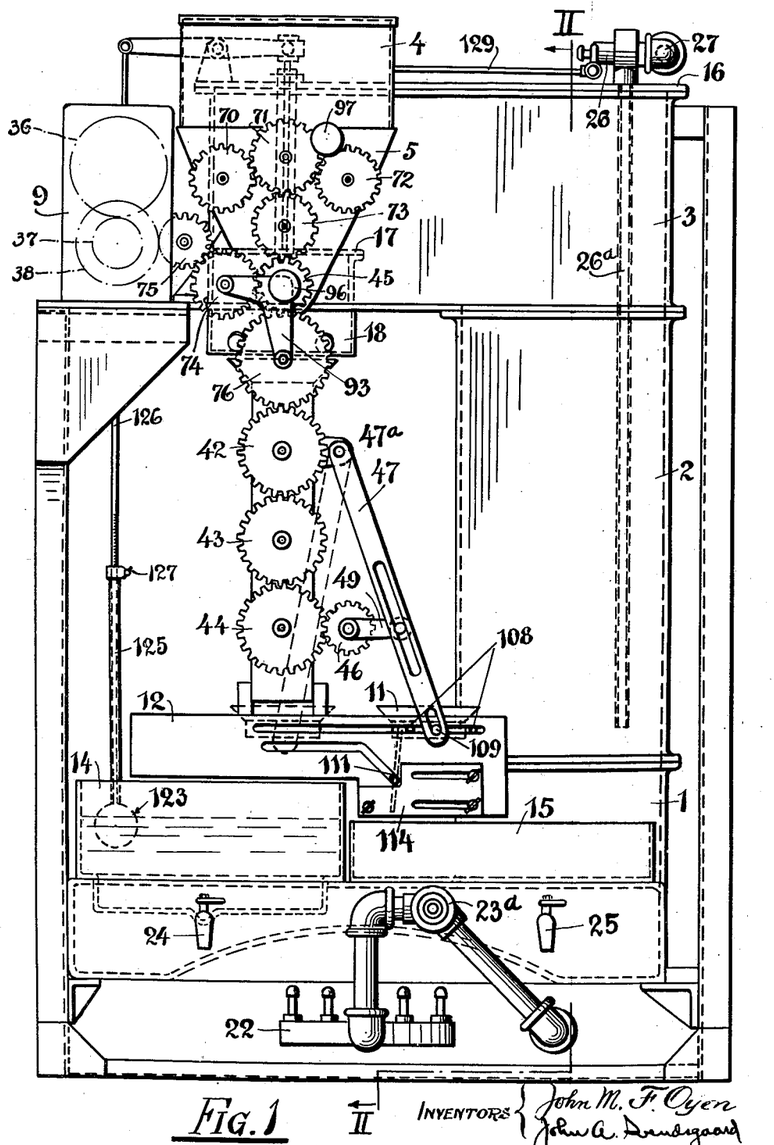
Fig. 1 is a front elevation of a machine embodying the present invention shown with the front removed to expose parts of the apparatus contained therein.
Figure 2:
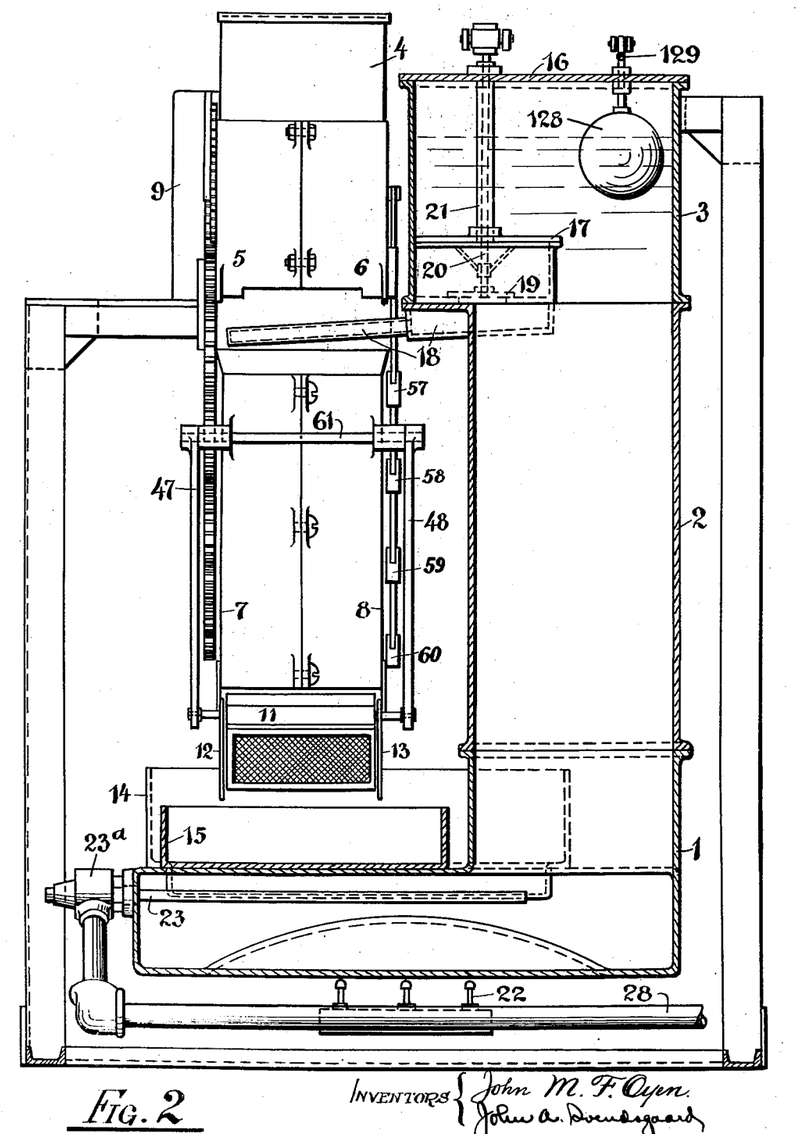
Fig. 2 is a vertical section taken substantially on line II—II of Fig. 1.
Figure 7:
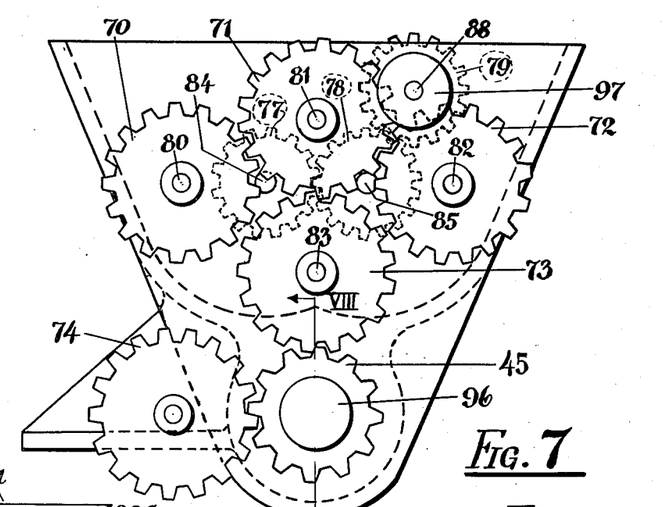
Fig. 7 is an enlarged view in front elevation illustrating details of construction of the dry coffee-measuring compartment.
Figure 11:
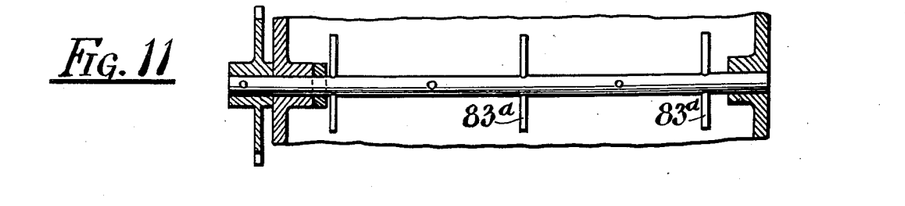
Fig. 11 is a detailed view of an agitator shaft which passes through the measuring compartment illustrated in Figs. 7 and 10.

Referring to Figs. 1 and 7, the gear 45 is shown as driving intermeshing gears 70, 71, 72 and 73 on the front of the coffee measuring chamber 5, and said gears are fixed on the outer ends of shafts 80, 81, 82 and 83, respectively, which shafts extend through the chamber and carry agitating pins 83a as shown in Fig. 11, the purpose of which pins is to stir or agitate the coffee in the hopper to prevent the same from clogging and cause it to flow freely into a coffee measuring tube.

Figures 8, 8A, 9:
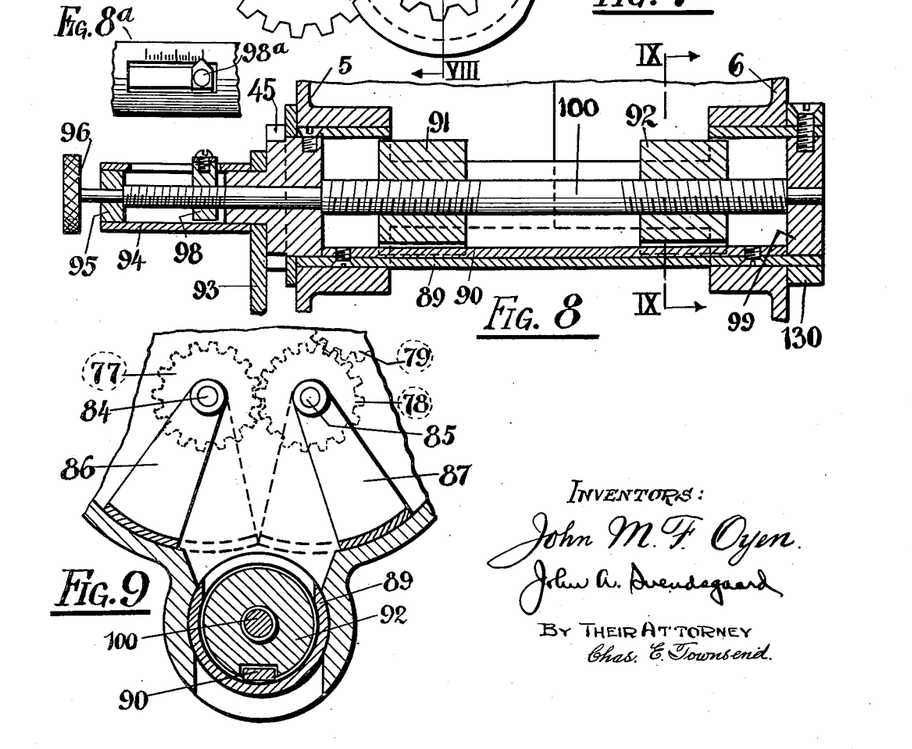
Fig. 8 is a sectional view taken on line VIII—VIII of Fig. 7.
Fig. 8a is a fragmentary plan view of a portion of the mechanism illustrated in Fig. 8.
Fig. 9 is a fragmentary sectional view taken on line IX—IX of Fig. 8.

The coffee measuring tube, which is disposed at the bottom of the chamber 5, is i'lustrated at 89 in Fig. 8 and is rotatably mounted in a cylindrical passage extending through the bottom of said chamber. The tube 89 has a side wall cut away for registry with an opening in the upper side of this cylindrical passage to receive coffee from the chamber 5 and for registry with a similar opening in the lower part of this passage to discharge the coffee so received when the tube is rotated through 180°. The said gear 45 seals one end of the tube 89 and the other end of the tube is closed by a plug 99, a collar 130 surrounding the exterior of the tube to prevent longitudinal movement thereof. An adjusting screw 100 which extends concentrically through the tube 89 is journaled at one end in the plug 99 and passes centrally through the gear 45 at its other end.

An extended hub on the outer face of the gear 45 carries an angular support 93 for idler gears 74 and 76 as illustrated in Fig. 1 and also carries a tube 94 provided with a suitable slot through which a nut 98 threaded to the adjusting screw 100 extends to carry a pointer 98a cooperating with graduations inscribed on the exterior of the tube 94. A plug 95 in the end of the tube forms a journal for the extended end of the adjusting screw 100 which is fitted with a knurled head 96. Cylindrical nuts 91 and 92 are threaded by right- and left-hand threads to the adjusting screw 100 so that upon rotation of the knurled head 96, the adjusting screw will cause the nuts to be advanced toward or away from each other, thus to vary the capacity of the measuring tube, and the pointer 98a will serve to indicate the space between the nuts 91 and 92, and thus the capacity of the tube. The nuts 91 and 92 are provided with longitudinal slots which fit over a feather key 90 secured to the interior of the tube 89 and extending longitudinally thereof so that the nuts will rotate with the tube but will be held against rotation upon being adjusted through the medium of the adjusting screw 100.

Figure 10:
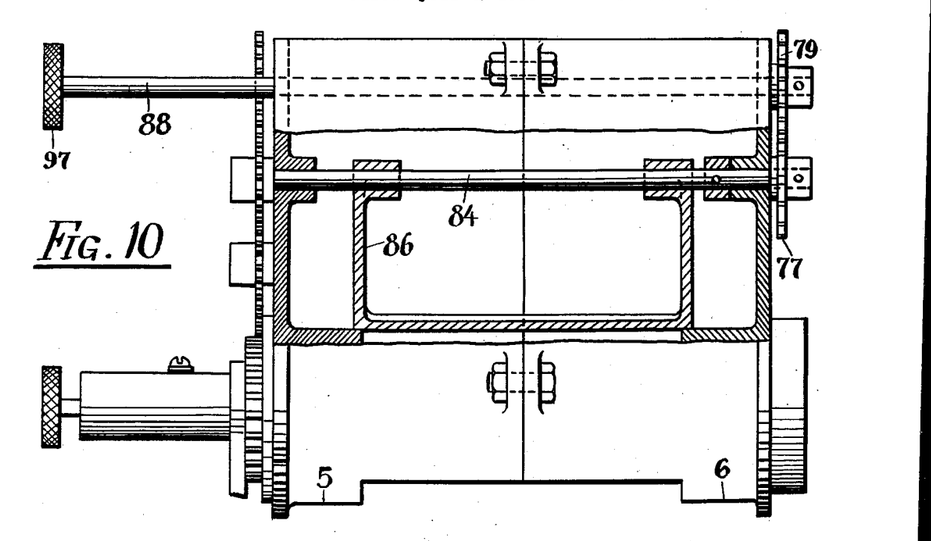
Fig. 10 is a side elevation of the coffee measuring compartment illustrated in Fig. 7 with parts broken away to disclose the interior thereof.

It is sometimes desirable to discontinue the feed of fresh coffee and to permit clear hot water to run through the coffee percolating chamber for the purpose of cleansing the same, and this is accomplished through mechanism illustrated in Figs. 9 and 10 wherein a pair of swinging gates 86 and 87 are shown as supported on shafts 84 and 85 to which are fixed gears 77 and 78. Gear 79, meshing with the gear 78, is fixed to shaft 96 having a knurled head 97 at its end. Thus, upon manipulation of the head 97, the shafts 84 and 85 may be rotated to swing the gates 86 and 87 from their open position illustrated in full lines in Fig. 9 to their closed position illustrated in dotted lines in the same figure, in which latter position they prevent coffee from entering the measuring tube 89.

Figures 5, 6:
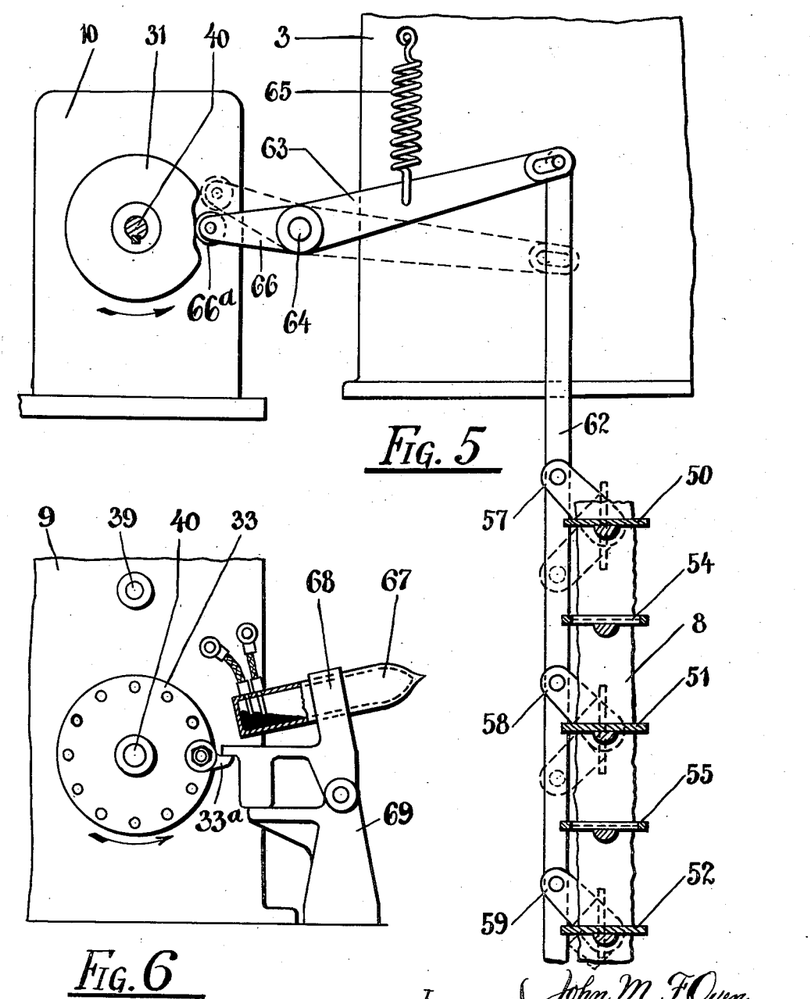
Fig. 5 is an enlarged fragmentary view illustrating details of construction of operating mechanism for the coffee intercepting and supporting plates.
Fig. 6 is an elevation in detail of an electric switch and operating means therefor to insure discontinuance of operation of the machine at a predetermined cyclic period.

The interior of the coffee percolating chamber, as illustrated in Fig. 5 and Figs. 15 to 21, inclusive, is provided with superposed interceptor plates 50, 51, 52 and 53 journaled for oscillating movement from a horizontal position as illustrated in full lines in Fig. 5 to a vertical position as illustrated in dotted lines. Also within the percolating chamber and intercepted with the said interceptor plates are screens 54, 55 and 56. When the machine is in operation, the interceptor plates 50, 51, 52 and 53 are normally disposed in their vertical position and the screens 54, 55 and 56 are horizontally disposed, and each of said screens supports a measured quantity of coffee through which hot water delivered through the tubes 18 is permitted to percolate. The screens 54, 55 and 56 carry and are operated by the gears 42, 43 and 44, respectively, (see Figs. 1 and 15) and upon the intermittent rotation of said gears through 180° as described above, said screens are inverted to spill the coffee supported on them to the interceptor plates disposed below them, which interceptor plates have at this moment been moved to their horizontal position. When the interceptor plates are again moved to their vertical positions, the coffee caught by each of these plates from the screen above it will again be spilled and deposited upon the screen directly beneath it. Simultaneously with the movement of the gears 42, 43 and 44, which movement inverts the screens, the gear 45 will make a complete revolution and cause the measuring tube 89 driven by it to deposit a measured quantity of fresh coffee on the uppermost interceptor plate 50 so that when the interceptor plates are moved to their vertical positions, a new supply of coffee will be delivered to the uppermost screen 54.

Figures 15, 16, 17, 18, 19, 20, 21:
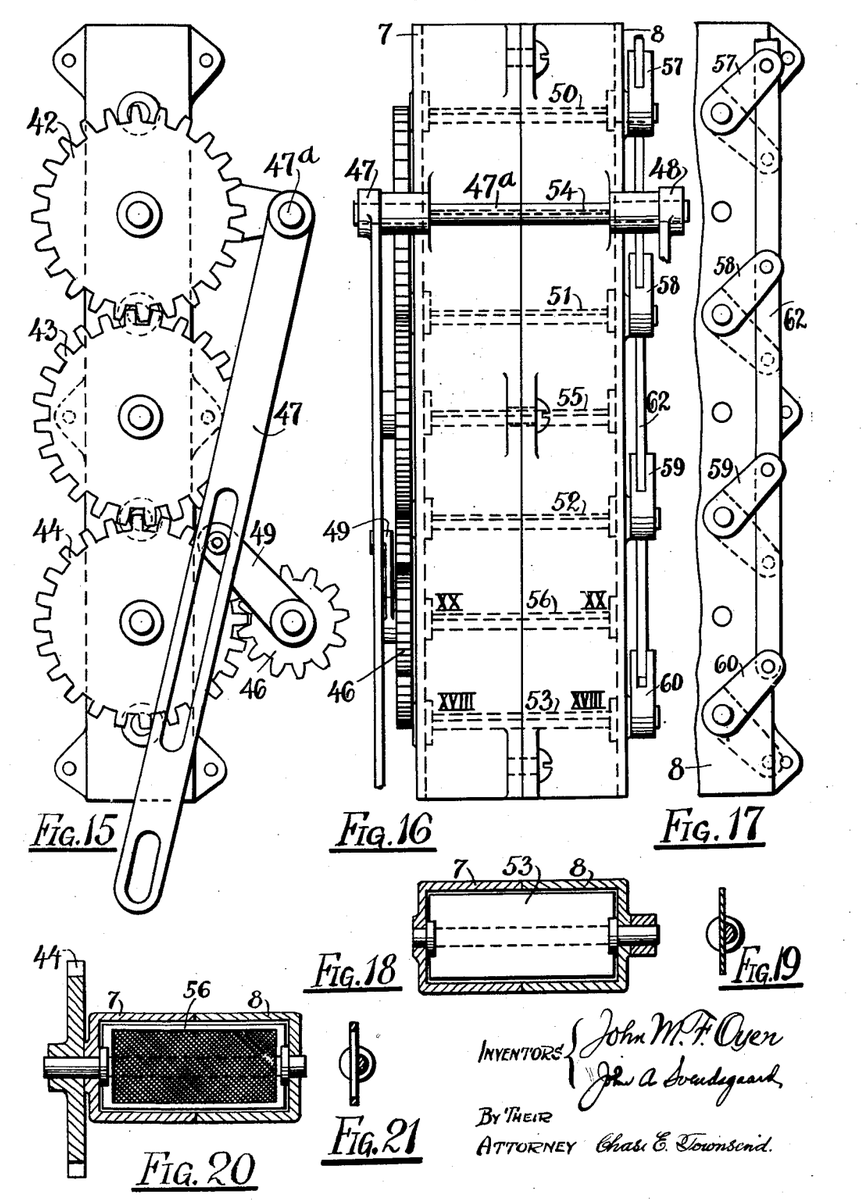
Fig. 15 is an enlarged front elevation of the coffee percolating chamber.
Fig. 16 is a similar view of the chamber illustrated in Fig. 15.
Fig. 17 is a fragmentary view illustrating in rear elevation part of the operating mechanism of the coffee percolating chamber shown in Figs. 15 and 16.
Fig. 18 is a sectional view taken on line XVIII—XVIII of Fig. 16.
Fig. 19 is a transverse sectional view of the intercepting plate shown in Fig. 18.
Fig. 20 is a sectional view taken on line XX—XX of Fig. 16.
Fig. 21 is a transverse section of the screen illustrated in Fig. 20.

The mechanism for oscillating the interceptor plates 50, 51, 52 and 53 is illustrated in Figs. 5, 16 and 17, wherein journals of these plates are shown as fitted with crank arms 57, 58, 59 and 60, respectively, these arms being pivotally connected to a rod 62, which is vertically reciprocated by a lever 63 fixed to a shaft 64. This lever is urged upwardly by a spring 65. The cam 31 (see Figs. 3, 5 and 13) which is driven by the motor 10, engages a roller 66a on the end of a lever 66, also fixed to the shaft 64, and through this engagement holds the lever 63 in its downward position illustrated in dotted lines to maintain the interceptor plates in their vertical position except for the cyclic interval when a depression in the periphery of said cam permits the lever to be momentarily raised upwardly by the spring 65 to move the interceptor plates to their horizontal positions.

Figures 22, 23, 24:
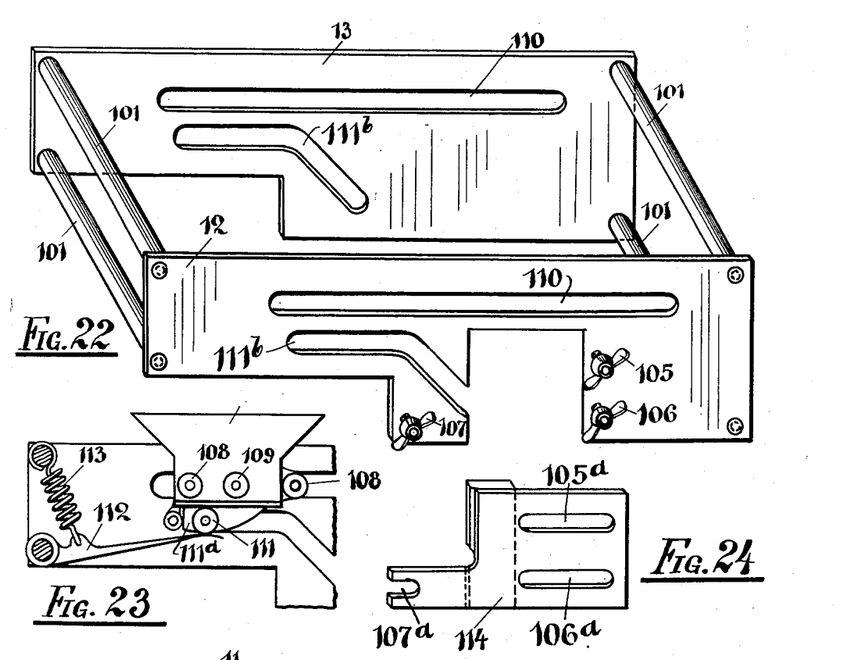
Fig. 22 is an enlarged perspective view illustrating the details of construction of a supporting track for a carriage which operates to discharge used coffee.
Fig. 23 is a detailed view of the said carriage in place on said track.
Fig. 24 is a perspective view in detail of a removable part of the track illustrated in Fig. 22.
Figures 25, 26:
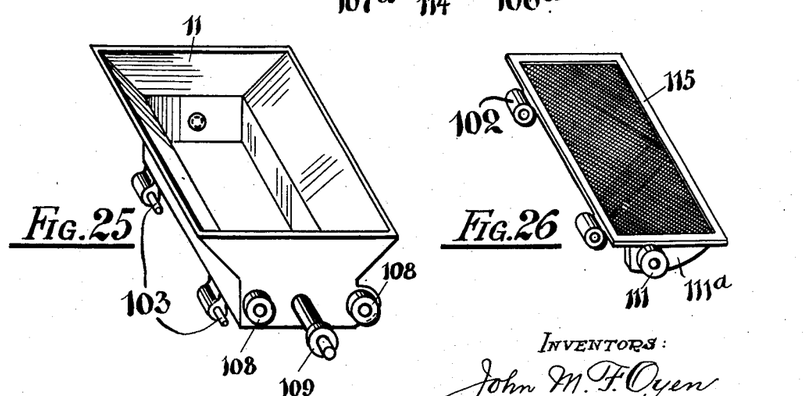
Fig. 25 is a perspective view of the carriage shown in Fig. 23.
Fig. 26 is a perspective view illustrating details of construction of a screen carried by and forming the bottom of the carriage illustrated in Fig. 25.

As the measured quantities of coffee supported on the screens 54, 55 and 56 are advanced downwardly through the operation of the screens and interceptor plates above defined, the lower of these three screens discharges its coffee on to a screen 115, which screen forms the bottom of the dumping carriage 11 illustrated in Figs. 1, 23 and 25. The carriage 11 is mounted for movement from the full line position to the dotted line position illustrated in Fig. 1 by means of rollers 108 guided in slots 110 provided in the plates 12 and 13 (see Fig. 22) which plates are held in spaced relation by means of spacing bars 101 as shown. The means for moving the carriage 11 from its full line position to its dotted line position is shown in Figs. 1 and 15, wherein the gear 44 is illustrated as meshing with a gear 46 which carries a crank arm 49 having a crank pin engaging the slot in a lever 47 which depends from a pivotal support 47a so that it may be oscillated on said support through the medium of the crank arm 49 each time the gear 44 operates. The ratio of the gears 44 and 46 is two to one; consequently, each 180° movement of the gear 44 which serves to invert the screen 56 will impart a complete rotation to the gear 46, thereby causing the lever 47 to swing from its dotted line position of Fig. 1 to its full line position and back again to its dotted line position. The lower end of the lever 47 engages the carriage 11 through a slot in the lower end of the lever and a pin 109 projecting from the carriage so that the carriage is caused to reciprocate from end to end of the tracks 110 by this periodic oscillation of the lever 47.

The screen 115 which forms the bottom of the carriage 11 is pivotally connected to the carriage by hinge bearings 102 (see Fig. 26) which pivotally and slidably fit pintles 103 on the carriage as shown in Fig. 25. Rollers 111 supported on cams 111a extending downwardly from the edge of the screen 115 operate in angular slots 111b formed in the plates 12 and 13. Thus, when the carriage is in its left-hand position as viewed in Figs. 1 and 2, the screen 115 will be held upwardly or closed by reason of the fact that the rollers 111 are in the higher portion of the slots 111b. When the carriage moves to the right, the downward direction of the slots 111b causes the screen 115 to be swung to a vertical discharge position, and coffee supported thereon is dumped into the receptacle 15. Return movement of the carriage causes the screen bottom thereof again to close, and in order to insure a tight closure, fingers 112 (see Fig. 23) which are urged upwardly by a spring 113, engage the cams 111a.

A gate 114, shown in Fig. 24, is provided to be attached to the side of the plate 12 by bolts having winged nuts 105, 106 and 107. These bolts project through slots 105a, 106a and 107a, respectively, in the gate 114 so that the gate is slidably supported on the plate 12, in a position to close the lower end of the slot 111b in said plate or to open it when desired. Upon sliding of this gate to open the slot 111b, the screen 115 may be removed from the bottom of the carriage 11 for cleaning, and a clean screen may be put in its place.

As the coffee is percolating through the percolating chamber 7—8, and as a fresh charge of coffee is being supplied at timed intervals to the uppermost screen 54 and the partially used coffee being advanced downwardly from screen to screen in the manner hereinbefore described, the carriage 11 carries the last or oldest charge of coffee to the right and deposits it in the receptacle 15. This operation of the carriage 11 is timed to take place after the coffee has been transferred from the screens to the underlying interceptor plates 50, 51, 52 and 53, and the carriage has returned to its position below the coffee percolator just before the interceptor plates are moved to their vertical positions to discharge onto the screens overlying them.

Figure 12:
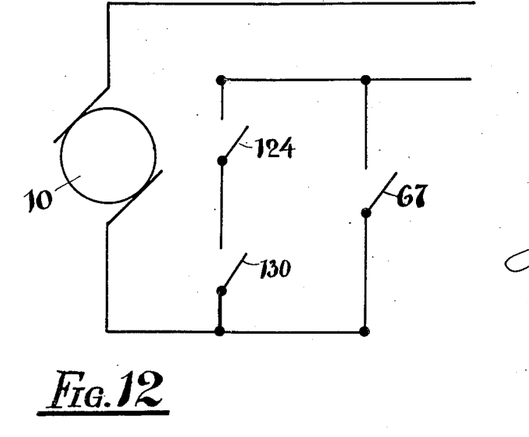
Fig. 12 is wiring diagram illustrating the switch circuit to the motor which operates the automatic mechanism of the machine.

Referring to Fig. 12, the motor 10 is illustrated as operated from a circuit including the wires 10a. In this circuit is included a manually operated switch 130 and an automatically controlled switch 124. A shunt circuit includes a timing switch 67 for the purpose of insuring stopping of the motor only at a time when the operation of the machine is in a predetermined cyclic position.

The operation of the switch 124 is controlled by the level of coffee in receptacle 14 in the following manner; A float 123 (see Fig. 1) in said receptacle is carried by a tubular rod 125 which telescopes over the lower end of a rod 126. When the coffee in the receptacle 14 reaches the desired level, the upper end of the tube 125 strikes a collar 127 adjustably secured to the rod 126, and raises this rod until it engages and rocks a mercury switch 124 (see Figs. 3 and 3a) thus opening the switch 124 and breaking the circuit to the motor 10 unless the switch 67 is in its closed position. The switch 67 is in the form of a mercury tube, as illustrated in Fig. 6, supported in a rocker 68 pivoted to a bracket 69 adjacent the transmission housing 9. The switch is normally in its closed position as illustrated in Fig. 6, but when the machine is in operation the disk 33 (see also Fig. 13) carries a pawl 33a which engages the rocker 68 and moves the switch to its open position to break the circuit to the motor once upon each revolution of the shaft 40. The disk 33 is provided with spaced perforations so that the pawl 33a may be secured to project from its periphery at any desired point. The position of the pawl 33a will preferably be such that it will effect opening of the switch 67 at the point of the cycle of operation when the discharge carriage 11 is in its discharge position as shown in full lines in Fig. 1. Consequently, assuming that the manually actuated switch 130 is closed and the automatically controlled switch 124 is closed so that the machine is in operation, the operation will continue until the level of coffee in the receptacle 14 effects opening of the switch 124. The motor will still be energized by the timing switch 67 in the shunt circuit until the machine comes to a proper position for rest, at which time the switch 67 will open, completely breaking the circuit to the motor and the machine will remain at rest until the level of the coffee in the receptacle 14 recedes to a point where the switch 124 will again be closed.

Having thus described our invention, what we claim and desire to secure by Letters Patent is—

1. In a coffee making machine, a plurality of alternately superposed coffee supporting screens and intercepting plates, means for turning the screens and plates in timed relation to cause coffee supported by them to be advanced downwardly step by step, and means for supplying water to percolate through the coffee supported by the screens.

2. In a coffee making machine, a plurality of alternately superposed coffee supporting screens and intercepting plates, and means for intermittently inverting the screens to discharge coffee supported by them and position them for reception of coffee on their opposite sides.

3. In a coffee making machine, a plurality of alternately superposed coffee supporting screens and intercepting plates, means for intermittently inverting the screens to discharge coffee supported by them and position them for reception of coffee on their opposite sides, and means operating alternately with the operation of the screens to move the intercepting plates to and from a coffee supporting position.

4. In a coffee making machine, a plurality of alternately superposed coffee supporting screens and intercepting plates, means for intermittently inverting the screens to discharge coffee supported by them and position them for reception of coffee on their opposite sides, means supporting the intercepting plates in horizontal positions to receive the coffee discharged by the screens, and means for moving the plates to vertical positions after the screens are inverted.

5. In a coffee making machine a vertically disposed percolating chamber, alternately arranged pivotally supported coffee screens and intercepting plates in said chamber, means for feeding measured charges of fresh dry coffee to the topmost screen, means for imparting pivotal movement to the screens and plates to effect transfer of said charges from screen to screen downwardly through the percolating chamber, and means for supplying hot water to the top of said chamber to percolate through the coffee supported on said screens.

6. In a coffee making machine, a vertically disposed percolating chamber, alternately arranged pivotally supported coffee screens and intercepting plates in said chamber, means for feeding measured charges of fresh dry coffee to the topmost screen, means for imparting pivotal movement to the screens and plates to effect transfer of said charges from screen to screen downwardly through the percolating chamber, means for supplying hot water to the top of said chamber to percolate through the coffee supported on said screens, a screen disposed beneath said chamber to finally receive said charges of coffee, and means for removing the last-named screen from beneath the chamber and discharging the coffee therefrom.

7. In a coffee making machine comprising a vertically disposed coffee making chamber with superposed reversible coffee supporting screens, means for delivering coffee in measured charges to said screens, means for supplying water to percolate through the coffee supported by the screens, and means for discontinuing the coffee supply during reversing of the screens and passage of water thereover to effect cleaning of the screens.

JOHN M. F. OYEN.
JOHN A. SVENDSGAARD.